Figure 1:
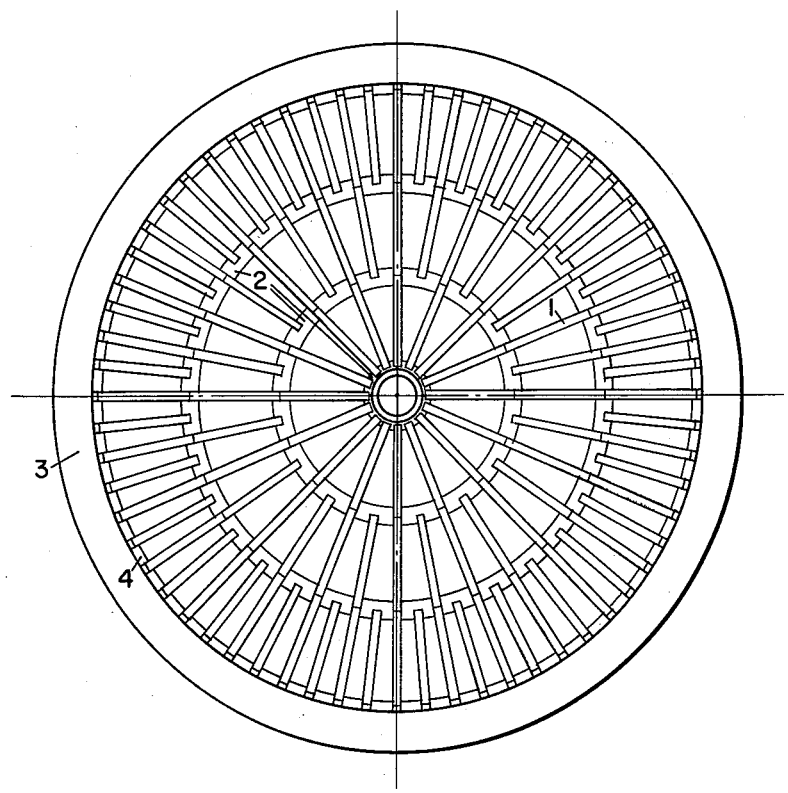

Jan. 15, 1963

H. D. GROVE, JR., ET AL 3,073,685

GAUZE CATALYST SUPPORT

Filed June 15, 1960

3 Sheets-Sheet 1

HERBERT D. GROVE JR.
BUDDY L. SATTERLEY
INVENTORS

BY

ATTORNEY

Jan. 15, 1963

H. D. GROVE, JR., ET AL 3,073,685

GAUZE CATALYST SUPPORT

Filed June 15, 1960

3 Sheets-Sheet 2

HERBERT D. GROVE JR.
BUDDY L. SATTERLEY
INVENTORS

BY *H. B. Roberts*

ATTORNEY

HERBERT D. GROVE JR.
BUDDY L. SATTERLEY
INVENTOR 3,073,685
GAUZE CATALYST SUPPORT
Herbert D. Grove, Jr., St. Louis, Mo., and Buddy L. Satterley, Houston, Tex., assignors to Monsanto Chemical Company, St. Louis, Mo., a corporation of Delaware
Filed June 15, 1960, Ser. No. 36,257
3 Claims. (Cl. 23—288)

This invention pertains to an improved apparatus for use in catalytic processes. More especially it relates to a new and novel support for a metallic gauze catalyst.

The use of metallic catalysts in the form of gauzes is well known. An example of such catalysts is the platinum and/or platinum-rhodium gauze used in the manufacture of hydrogen cyanide and nitric oxide. This type of catalyst is highly efficient and generally superior to other forms of the same catalytic metals. Lab size reactors are ideally suited for using these gauzes since the span of the reactor is small and little difficulty is encountered in providing support for the gauzes. For example, the gauze can frequently be clamped in place between flanges. In such installations platinum embrittlement frequently occurs but goes unobserved due to short on-stream times.

With an increase in size in the reactor, however, gauze support becomes a problem. Attempts have been made to circumvent the problems presented, by the use of rods or beams of silica, quartz, or ceramics. Some of these, though, require elcetrical heating elements and other accessories to minimize platinum embrittlement. Other devices or techniques while successful in commercial reactors up to three feet in diameter cannot be used in reactors having diameters in excess of this size. For example, the unique catalyst structure of conically shaped multi-layered wire gauze with the circular edge at the base attached to a metal mounting section for a catalyst support described in U.S. Patent 2,552,279 is limited to reactors of approximately 3 feet in diameter or less. Similarly limited is the scheme in U.S. Patent 2,607,663 which claims a metal gauze catalyst of several layers to form a pack and discloses fastening the metal gauze pack on the edges to fit into a reaction chamber supporting the pack and forming a gas-tight seal at the periphery. Because there are no internal supports, the use of this technique is obviously outlawed in reactors having diameters in excess of three feet.

It has been found that for large-scale production of hydrogen cyanide, i.e., in the order of 20,000,000 pounds per year, the internal diameter of the reactor must be approximately six feet or more. All devices which hold gauze catalyst by clamping the edges do not lend themselves as any practical means of support for such catalyst in a reactor greater than approximately three feet in diameter because without a supporting structure the gauze would be torn from the edges in a very short time.

There are other substantial problems created in translating reactors using gauze catalyst packs to commercial sizes of approximately six feet in diameter or more. Large differential expansions are encountered between the gauze, the screen support beneath the gauze, and the more massive supports beneath the screen. Massive metal supports for example, are practically impossible because of these differential expansions. Even ceramic supports must be carefully engineered for these problems. Furthermore, the reactions in the manufacture of hydrogen cyanide, nitric oxide, and like catalytic reactions occur at temperatures from 750° C. to 1200° C., a range in which the strength of structural metals and other construction materials is very limited. Metallic catalysts are notoriously susceptible to poisoning by many other non-catalytic metallic elements and this factor is important too particularly in the case of platinum-rhodium catalysts. Platinum can also undergo reactions with hydrocarbons to form brittle platinum carbides. This is especially true under the conditions of the hydrogen cyanide reaction. In addition to these considerations, a commercial reactor for the production of the products above must provide convenience of catalyst replacement and uniformity of pressure drop for an even flow distribution. Likewise, a means to maintain the gauze in place during flow surges is also needed.

Some attempts have been made to overcome these problems. For example, U.S. Patent No. 2,750,206 claims a catalytic reactor for the production of hydrogen cyanide utilizing a flat catalyst gauze. The support in this case for the catalyst gauze comprises one central water-cooled metallic beam with carborundum bars supported by the reactor and the central beam with a network of nickel-chromium-iron alloy strips reposing on the bars and upon which the gauze catalyst rests. This, however, is not practical in reactors with internal diameters of approximately 6 feet and greater because of the limited strength of the alloy strips and carborundum bars when the length exceeds a predetermined figure.

Thus, there exists an urgent need in the art for a support for a large flat gauze catalyst in a reactor that does not limit the size of the reactor and permits continuous increases in production of hydrogen cyanide or nitric oxide from a single reactor. Prior to this invention no combination of support geometry and known materials that have the necessary strength and heat resistance properties had been found.

Therefore, it is the object of this invention to furnish a support for a gauze catalyst that does not limit the size of the reactor. It is a further object of this invention to provide a support which withstands severe temperature stresses with little adverse effect. Another object is to provide a support that eliminates the severe sagging of the gauze catalyst in large diameter reactors. Another object to this invention is to provide a support in which carbon embrittlement of a metallic gauze catalyst is eliminated or minimized. It is a still further object of this invention to provide a light, inexpensive, and highly adaptable means of supporting gauze catalyst in the manufacture of hydrogen cyanide and nitric oxide. Yet another object of this invention is to provide a support and hold-down ring for the gauze catalyst which will not poison the catalyst.

The above and other objects of the invention which will become apparent from the following description are accomplished by providing a support structure for a metallic catalyst gauze pack comprising at least one nickel-chromium wire screen held up by a grate composed of radially spaced ceramic rods. This grate is supported above the reactor floor by ceramic castable refractories. A free floating nickel-chromium ring pins the gauze to the support and holds the gauze catalyst without the use of clamps against the periphery of the reactor to eliminate by-passing of the gases. This invention finds specific embodiment in the manufacture of hydrogen cyanide and nitric oxide.

The invention will be readily understood from a study of the attached drawings, FIGURE 1–4, described in the following paragraphs.

FIGURE 1 is a plan view of 112 ceramic support rods, 1 inch in diameter by 10¾ inches long, one of which is designated as 1. These rods are manufactured of silicon carbide. The rods are supported at the center and at two intermediate locations by specially shaped, high purity, super-alumina castable refractories, 2. These castable refractories are rings three inches high and from approximately eight to fifty-one inches in outside diameter and are composed of interlocking segments. The rods are supported at the periphery of the reactor by a fire brick ledge, 4, more fully shown in FIGURE 2. The reactor wall consisting of circle fire brick is 3.

Figure 2:
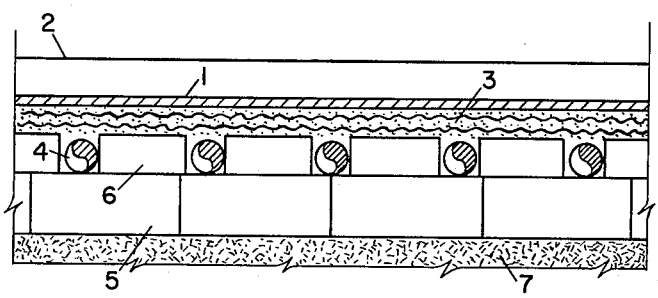

In FIGURE 2 showing a cross-section cutting across the ceramic support rods looking toward the reactor wall in the example above, 1 is the gauze catalyst which consists of multiple layers of 80-mesh, 3-mil, 90%–10% platinum-rhodium wire. The hold-down ring 2 is 80% nickel–20% chromium, and essentially iron free. The support screens 3 are four mesh by 0.063 inch wire and are also 80% nickel–20% chromium and iron free. The screens are oriented at 45° to each other. The one inch in diameter ceramic rods are designated in this drawing by 4. They rest on the fire brick ledge 5, which is cemented with sillimanite mortar. Loose spacer bricks 6 separate the ceramic rods to maintain the proper distance between each rod in the radial design.

Figure 3:
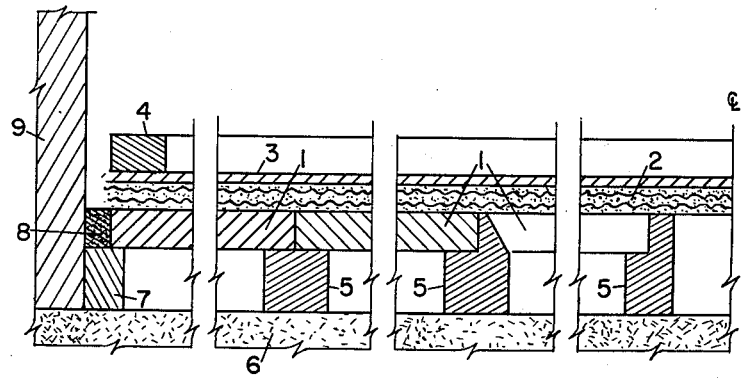

In FIGURE 3, showing a cross-section along the ceramic support rods in the reactor 1 is the ceramic support rod. The nickel-chromium screens are 2. The gauze catalyst pack is indicated by 3 and the nickel-chromium hold-down ring is 4. The ceramic support rods repose on the castable refractories 5, which in turn rest on the castable reactor floor 6. The ceramic rods are supported at the periphery of the reactor by the brick ledge 7. The rod ends are spaced by special spacer brick shown in FIGURE 2 which also act as a seal between the gauze catalyst pack and the reactor wall. The rods are held in the proper longitudinal position with space for expansion by Fiberfrax ceramic filter paper indicated as 8. The brick ledge 7 and the ceramic filter paper spacer are set firm against the circle brick reactor wall 9.

Figure 4:
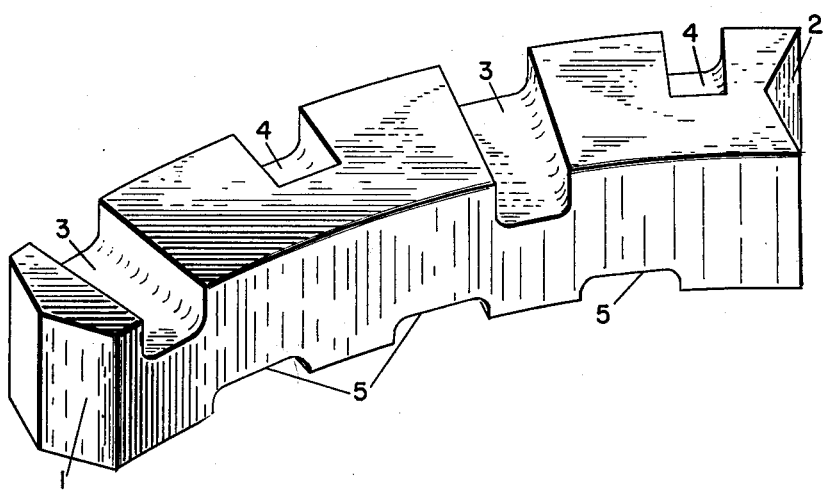

FIGURE 4 shows an isometric view of the super alumina castable refractories upon which the rods rest. The interlocking ends are designated by 1 and 2. The slots in which the rods rest are indicated as 3 and 4. The slot 3, which is a full slot, supports the ends of two rods while the half slot 4 supports the end of only one rod. The curvature of the ceramic castable can be noted in the drawing. This will vary depending on how far from the center of the reactor the support is located. The slots through the bottom of the ceramic castables 5 are provided for free passage of reaction gases across the reactor.

As an example in the manufacture of hydrogen cyanide from a reaction mixture of air, methane, and ammonia in a downdraft 72 inch inside diameter reactor, 3000 pounds per hour of ammonia and 30,000 pounds per hour of air are mixed in a pipe line. Subsequently 3000 pounds per hour of methane are added to this mixture and the total reaction mixture is fed to the reactor at approximately 100° C. The reaction mixture passes through the hot platinum-rhodium gauze catalyst and leaves the reactor at approximately 1150° C. The reactor effluent contains about 7½% hydrogen cyanide, 75% nitrogen, 11% carbon monoxide, and minor amounts of argon, carbon dioxide, methane, ammonia, and hydrogen. This mixture is cooled and the hydrogen cyanide separated by absorption, stripping, and distillation. The life of the gauze catalyst using the support of this invention was in excess of 1800 hours whereas the life of the same gauze catalyst using a conventional support was never greater than approximately 250 hours.

A unique and novel feature of this support as compared to one of metal in this size is its ability to resist the heat concentration and to conduct this heat to adjacent cooler areas thereby equalizing stresses more uniformly.

This type of gauze catalyst support is adaptable to any size reactor for which a level support surface for building is available. This invention can be practiced preferably in reactors of 3 to 20 feet in diameter.

The wire screen and hold-down ring can be manufactured of any metallic material which is inert with respect to the reactant gases in the reactor and does not affect the gauze and, further, can withstand the temperatures present during the reaction and still maintain the necessary strength. It is desirable but not necessary that the hold-down ring and wire screen be constructed of the same materials. For instance, in the production of hydrogen cyanide from methane, air, and ammonia, nickel-chromium alloy is a satisfactory material for construction of both the wire screen and the hold-down ring.

The ceramic support rods can be manufactured of self-bonded silicon carbide, nitride-bonded silicon carbide, aluminum oxide, silicon dioxide, or similar materals. The castable refractories can be produced of materials similar to high purity super alumina.

The apparatus of this invention, therefore, provides a catalyst support which allows reactors greater than 3 feet in diameter to be constructed thus providing for greater production per reactor. This is particularly true in the case of hydrogen cyanide and nitric oxide. This invention further provides a support for the gauze catalyst in which the catalyst does not fail during the production of hydrogen cyanide and nitric oxide because it is amply supported by materials which do not affect the reaction and have sufficient strength and heat resistance to withstand the conditions inside the reactor.

What is claimed is:

1. An apparatus for support of a metallic gauze catalyst pack in a reactor used in the catalytic manufacture of hydrogen cyanide, said reactor being from 3 to 20 feet in diameter, which comprises in combination at least one wire screen supported by a grate composed of radially spaced ceramic rods free to move in a longitudinal direction, said grate being supported above the reactor floor by a plurality of concentric ceramic refractory supporting rings mounted so as to provide for lateral expansion and contraction, and said gauze pack being held down by the weight of a free floating metallic ring.

2. The support apparatus described in claim 1 wherein the ceramic support rods are from ½ inch to 3 inches in diameter and from 3 inches to 24 inches in length.

3. The support apparatus described in claim 1 wherein the wire screens are constituted of nickel-chromium alloy, the ceramic support rods are manufactured of high temperature ceramic materials selected from the group consisting of self-bonded silicon carbide, nitride-bonded silicon carbide, aluminum oxide, and silicon dioxide, the ceramic refractories are manufactured of high purity super alumina, and the hold-down ring is manufactured of nickel-chromium alloy.

References Cited in the file of this patent

UNITED STATES PATENTS 2,832,675   Radke et al. _____ Apr. 29, 1958

FOREIGN PATENTS 801,806   Great Britain _____ Sept. 24, 1958